United States Patent
Kubo et al.

(10) Patent No.: US 11,916,204 B2
(45) Date of Patent: Feb. 27, 2024

(54) METHOD OF PRODUCING LITHIUM-ION BATTERY

(71) Applicant: Prime Planet Energy & Solutions, Inc., Tokyo (JP)

(72) Inventors: Makoto Kubo, Kasai (JP); Kazunori Donoue, Kobe (JP); Shinya Miyazaki, Tokushima (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 185 days.

(21) Appl. No.: 17/499,865

(22) Filed: Oct. 13, 2021

(65) Prior Publication Data

US 2022/0123379 A1   Apr. 21, 2022

(30) Foreign Application Priority Data

Oct. 15, 2020   (JP) .................................. 2020-173948

(51) Int. Cl.
*H01M 10/44* (2006.01)
*H01M 10/04* (2006.01)
*H01M 50/609* (2021.01)
*H01M 10/0525* (2010.01)

(52) U.S. Cl.
CPC ......... *H01M 10/446* (2013.01); *H01M 10/04* (2013.01); *H01M 10/0525* (2013.01); *H01M 50/609* (2021.01)

(58) Field of Classification Search
None
See application file for complete search history.

(56) References Cited

U.S. PATENT DOCUMENTS

| | | | |
|---|---|---|---|
| 2012/0141869 A1 | 6/2012 | Takahata | |
| 2015/0207147 A1 | 7/2015 | Nagai et al. | |
| 2016/0329613 A1* | 11/2016 | Kusachi | ................ H01M 4/525 |
| 2018/0309159 A1 | 10/2018 | Hori | |

FOREIGN PATENT DOCUMENTS

| | | |
|---|---|---|
| CN | 102549831 A | 7/2012 |
| CN | 104428942 A | 3/2015 |
| CN | 108736060 A | 11/2018 |
| CN | 110416608 A | 11/2019 |
| JP | 201727653 A | 2/2017 |
| JP | 2020-167054 A | 10/2020 |
| WO | 2012/079389 A1 | 6/2012 |
| WO | 2013/005502 A1 | 1/2013 |

* cited by examiner

*Primary Examiner* — Brian R Ohara
*Assistant Examiner* — Patrick Marshall Greene
(74) *Attorney, Agent, or Firm* — HAUPTMAN HAM, LLP

(57) ABSTRACT

(A) An electrolyte solution containing lithium bis(oxalato)borate and vinylene carbonate is injected into a lithium-ion battery. (B) Initial charging is performed. (C) Aging is performed. During the aging, lithium bis(oxalato)borate and vinylene carbonate contained in the electrolyte solution are degraded. After the aging, in the electrolyte solution, a mass fraction of lithium bis(oxalato)borate is less than 0.10% and a mass fraction of vinylene carbonate is less than 0.10%.

5 Claims, 2 Drawing Sheets

METHOD OF PRODUCING LITHIUM-ION BATTERY

This nonprovisional application is based on Japanese Patent Application No. 2020-173948 filed on Oct. 15, 2020, with the Japan Patent Office, the entire contents of which are hereby incorporated by reference.

BACKGROUND OF THE INVENTION

Field of the Invention

The present disclosure relates to a method of producing a lithium-ion battery.

Description of the Background Art

Japanese Patent Laying-Open No. 2017-027653 discloses an electrolyte solution containing lithium bis(oxalato)borate.

SUMMARY OF THE INVENTION

An electrolyte solution of a lithium-ion battery (which may be simply called "battery" hereinafter) may contain various additives. For example, lithium bis(oxalato)borate (LiBOB) and vinylene carbonate (VC) may be added to the electrolyte solution. The addition of LiBOB and VC may cause formation of a film on a surface of a negative electrode during initial charging. The resulting film may lead to, for example, an enhanced capacity retention during high-temperature storage.

It is considered that the formation of the film is caused by reduction and degradation of each of LiBOB and VC on the surface of the negative electrode during initial charging. The reduction potential of LiBOB is higher than the reduction potential of VC. Because of that, LiBOB may form a film before VC does so. A film derived from LiBOB may inhibit reduction and degradation of VC. Therefore, when LiBOB and VC are used in combination, VC tends to remain in a large amount after initial charging, leading to an increase in the amount of gas generation during high-temperature storage.

An object of the present disclosure is to decrease the amount of gas generation during high-temperature storage.

Hereinafter, the technical configuration and effects of the present disclosure will be described. It should be noted that the action mechanism according to the present disclosure includes presumption. The scope of claims should not be limited by whether or not the action mechanism is correct.

[1] A method of producing a lithium-ion battery comprises the following (A), (B), and (C):

(A) injecting an electrolyte solution into a lithium-ion battery, the electrolyte solution containing lithium bis(oxalato)borate and vinylene carbonate;

(B) performing initial charging of the lithium-ion battery including the electrolyte solution; and (C) aging the lithium-ion battery after the initial charging.

During the aging, lithium bis(oxalato)borate and vinylene carbonate contained in the electrolyte solution are degraded. After the aging, in the electrolyte solution, a mass fraction of lithium bis(oxalato)borate is less than 0.10% and a mass fraction of vinylene carbonate is less than 0.10%.

For decreasing an increase in gas generation caused by remaining VC, use of an electrolyte solution containing LiBOB but not containing VC may be considered, for example. However, when VC is not present, gas generation during high-temperature storage tends to rather increase.

Alternatively, use of an electrolyte solution not containing LiBOB but containing VC may also be considered. Without LiBOB, which inhibits VC degradation, the amount of gas generation is expected to be decreased. However, when LiBOB is absent, a desired level of capacity retention tends not to be obtained during high-temperature storage.

In the method of producing a lithium-ion battery according to the present disclosure, an electrolyte solution containing both LiBOB and VC is used, and, after initial charging, aging is performed so that both a mass fraction of LiBOB and a mass fraction of VC become less than 0.10%. Although the exact mechanism is unclear, the method of producing a lithium-ion battery according to the present disclosure is expected to provide a desired level of capacity retention and a decrease in gas generation during high-temperature storage.

[2] The aging may comprise, for example, the following (c1) and (c2):

(c1) adjusting a state of charge of the lithium-ion battery so that an electric potential of a negative electrode is equal to or less than both a reduction potential of lithium bis(oxalato)borate and a reduction potential of vinylene carbonate; and (c2) storing the lithium-ion battery in an environment at a temperature of 60° C. or more for 10 hours or more.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Next, an embodiment of the present disclosure (also called "the present embodiment" hereinafter) will be described. It should be noted that the below description does not limit the scope of claims.

In the present specification, a numerical range such as "from 0.1 parts by mass to 10 parts by mass" includes both the upper limit and the lower limit, unless otherwise specified. For example, "from 0.1 parts by mass to 10 parts by mass" means a numerical range of "not less than 0.1 parts by mass and not more than 10 parts by mass". Moreover, any numerical value selected from the numerical range in question may be used as a new upper limit and/or a new lower limit. For example, any numerical value described in Examples and any numerical value within the numerical range may be combined to create a new numerical range.

In the present specification, when a compound is represented by a stoichiometric composition formula such as "$LiCoO_2$", this stoichiometric composition formula is merely a typical example. For example, when lithium cobalt oxide is represented as "LiCoO$_2$", the composition ratio of lithium cobalt oxide is not limited to "Li/Co/O=1/1/2" but Li, Co, and O may be included in any composition ratio, unless otherwise specified. The composition ratio may be non-stoichiometric.

In the present specification, the expression "consist essentially of" means a concept between "consist of" and "comprise". The expression "consist essentially of" means that an additional component may also be included in addition to an essential component or components, unless an object of the present disclosure is impaired. For example, a component that is usually expected to be included in the relevant technical field (such as inevitable impurities, for example) may be included as an additional component.

<Method of Producing Lithium-Ion Battery>

Figure 1:
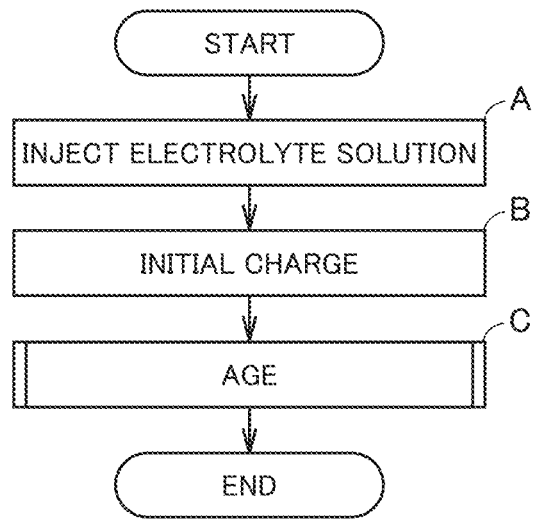
FIG. 1 is a schematic flowchart depicting a method of producing a lithium-ion battery according to the present embodiment.

FIG. 1 is a schematic flowchart depicting a method of producing a lithium-ion battery according to the present embodiment. The method of producing a battery according to the present embodiment includes "(A) injecting an electrolyte solution", "(B) initial charging", and "(C) aging". In the method of producing a battery according to the present embodiment, a lithium-ion battery is produced. The "lithium-ion battery" according to the present embodiment is a secondary battery that includes lithium ions as carrier ions. The lithium-ion battery may be used in any applications. For example, the lithium-ion battery may be used as a main electric power supply or a motive force assisting electric power supply in an electric vehicle. A plurality of the lithium-ion batteries (cells) may be connected together to form a battery module or a battery pack.

<<(A) Injecting Electrolyte Solution>>

The method of producing a battery according to the present embodiment comprises injecting an electrolyte solution into a battery. The electrolyte solution contains LiBOB and VC.

(Battery)

Figure 2:
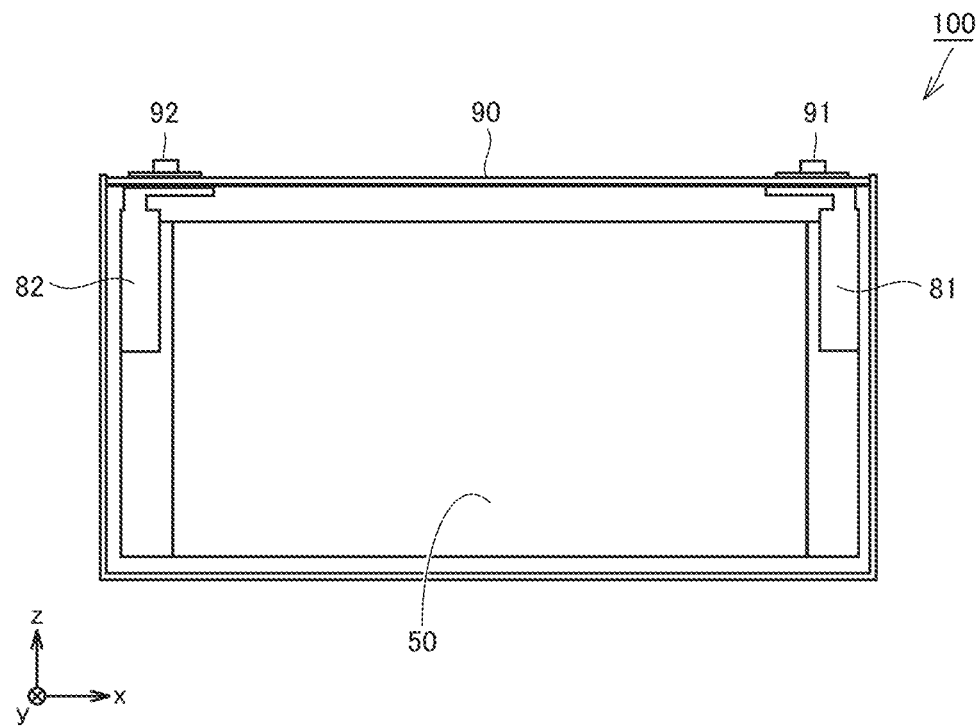
FIG. 2 is a schematic view illustrating an example configuration of a lithium-ion battery according to the present embodiment.

FIG. 2 is a schematic view illustrating an example configuration of a lithium-ion battery according to the present embodiment.

A battery 100 into which the electrolyte solution is to be injected is assembled. The assembling procedure is not limited. An example configuration of battery 100 will be described below.

Battery 100 includes a housing 90. Housing 90 is prismatic (a flat, rectangular parallelepiped). For example, housing 90 may be made of an aluminum (Al) alloy. For example, housing 90 may be provided with an inlet (not illustrated) for the electrolyte solution. The inlet may be configured to be opened and closed.

The prismatic shape is merely an example. The housing according to the present embodiment may have any configuration. For example, the housing may be cylindrical or may be a pouch.

Housing 90 accommodates an electrode assembly 50. Electrode assembly 50 is connected to a positive electrode terminal 91 via a positive electrode current-collecting member 81. Electrode assembly 50 is connected to a negative electrode terminal 92 via a negative electrode current-collecting member 82.

Figure 3:
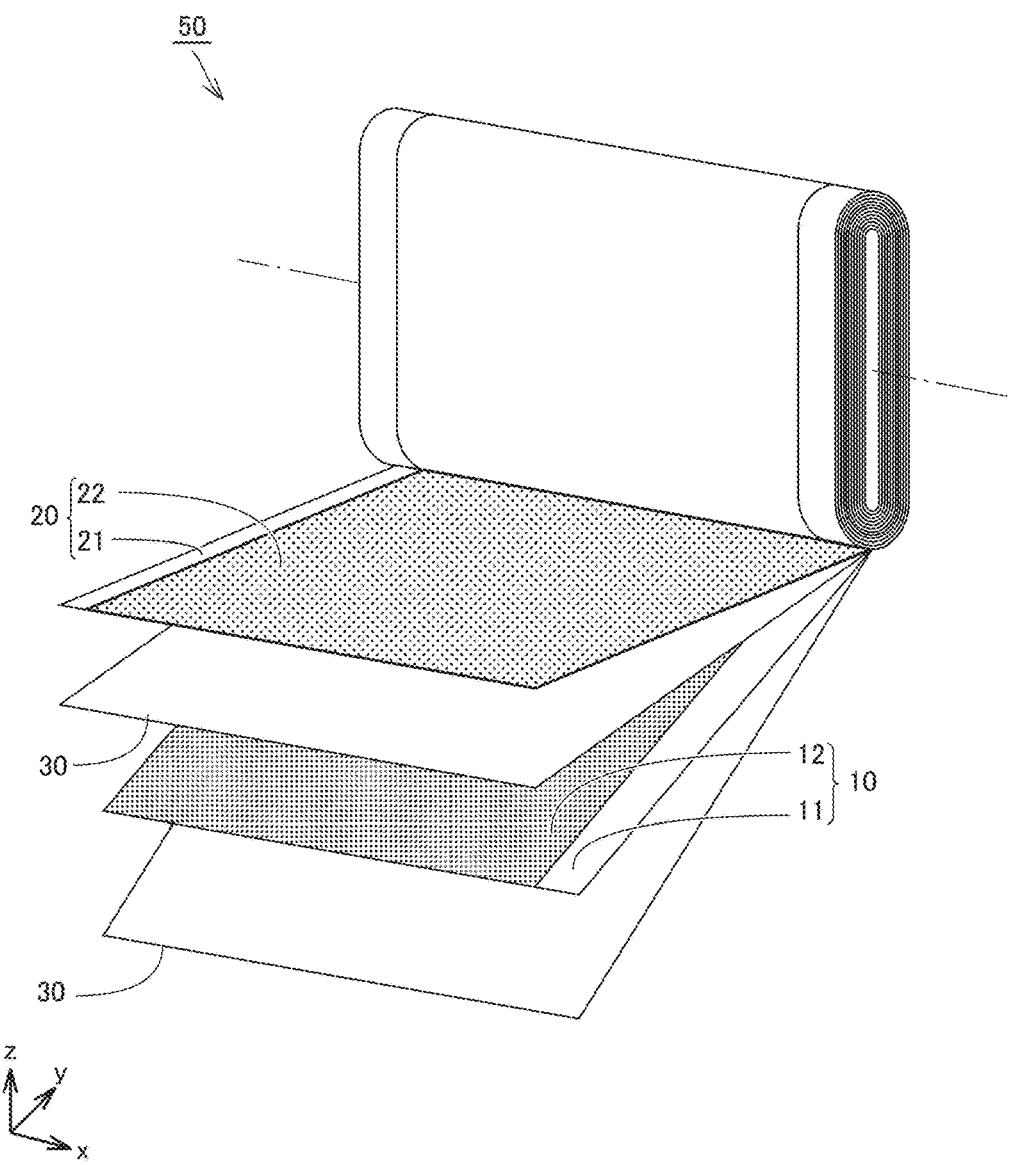
FIG. 3 is a schematic view illustrating an example of an electrode assembly according to the present embodiment.

FIG. 3 is a schematic view illustrating an example of an electrode assembly according to the present embodiment.

Electrode assembly 50 is a wound-type one. Electrode assembly 50 includes a positive electrode 10, a separator 30, and a negative electrode 20. Each of positive electrode 10, separator 30, and negative electrode 20 is a belt shape sheet. Electrode assembly 50 may include two separators 30. Electrode assembly 50 is formed by stacking positive electrode 10, separator 30, and negative electrode 20 in this order and then winding them in a spiral manner. After the winding, electrode assembly 50 is shaped into a flat form. The wound-type one is merely an example. Electrode assembly 50 may be a stack-type one, for example.

Positive electrode 10 may be produced by, for example, placing a positive electrode composite material 12 on a surface of a positive electrode current collector 11. Positive electrode current collector 11 may include an Al foil and/or the like, for example. Positive electrode composite material 12 may include a positive electrode active material, a conductive material, a binder, and the like, for example. The positive electrode active material may include an optional component. The positive electrode active material may include, for example, at least one selected from the group consisting of LiCoO$_2$, LiNiO$_2$, LiMnO$_2$, LiMn$_2$O$_4$, Li(NiCoMn)O$_2$, Li(NiCoAl)O$_2$, and LiFePO$_4$. Here, the expression "(NiCoMn)" in the composition formula "Li(NiCoMn)O$_2$", for example, means that the constituents within the parentheses are collectively regarded as a single unit in the entire composition ratio. The conductive material may include an optional component. The conductive material may include acetylene black (AB) and/or the like, for example. The amount of the conductive material may be, for example, from 0.1 parts by mass to 10 parts by mass relative to 100 parts by mass of the positive electrode active material. The binder may include an optional component. The binder may include polyvinylidene difluoride (PVdF) and/or the like, for example. The amount of the binder may be, for example, from 0.1 parts by mass to 10 parts by mass relative to 100 parts by mass of the positive electrode active material.

Negative electrode 20 may be produced by, for example, placing a negative electrode composite material 22 on a surface of a negative electrode current collector 21. Negative electrode current collector 21 may include a copper (Cu) foil and/or the like, for example. Negative electrode composite material 22 may include a negative electrode active material, a binder, and the like, for example. The negative electrode active material may include an optional component. The negative electrode active material may include, for example, at least one selected from the group consisting of graphite, soft carbon, hard carbon, Si, SiO, Si-based alloy, Sn, SnO, Sn-based alloy, and Li$_4$Ti$_5$O$_{12}$. The binder may include an optional component. The binder may include, for example, at least one selected from the group consisting of carboxymethylcellulose (CMC) and styrene-butadiene rubber (SBR). The amount of the binder may be, for example, from 0.1 parts by mass to 10 parts by mass relative to 100 parts by mass of the negative electrode active material.

At least part of separator 30 is interposed between positive electrode 10 and negative electrode 20. Separator 30 separates positive electrode 10 from negative electrode 20. Separator 30 is porous. Separator 30 allows permeation of an electrolyte solution therethrough. Separator 30 is electrically insulating. Separator 30 may be made of polyolefin, for example. On a surface of separator 30, a heat-resistant layer and/or the like may be formed, for example.

(Electrolyte Solution)

A predetermined amount of an electrolyte solution is injected into housing 90 through the inlet provided in housing 90, for example. Electrode assembly 50 is impregnated with the electrolyte solution. After the electrolyte solution is injected, housing 90 is hermetically sealed. For example, housing 90 may be hermetically sealed after initial charging, which is described below.

The electrolyte solution includes a solvent, a supporting electrolyte, and an additive. The additive includes LiBOB and VC. In other words, the electrolyte solution includes LiBOB and VC. As long as it includes LiBOB and VC, the electrolyte solution may further include an optional additive.

In the present embodiment, the electrolyte solution at the time of injection is also called "initial electrolyte solution". In the initial electrolyte solution, LiBOB may have a mass fraction more than 0.10%, for example. In the initial electrolyte solution, LiBOB may have a mass fraction from 0.20% to 0.50% or may have a mass fraction from 0.30% to 0.40%, for example. In the initial electrolyte solution, VC may have a mass fraction more than 0.10%, for example. In the initial electrolyte solution, VC may have a mass fraction from 0.10% to 0.50% or may have a mass fraction from 0.10% to 0.30%, for example.

In the initial electrolyte solution, the sum of the mass fraction of LiBOB and the mass fraction of VC may be from 0.30% to 1.00% or may be from 0.40% to 0.70%, for example.

Each of the mass fraction of LiBOB and the mass fraction of VC is a value relative to the entire electrolyte solution. Each of the mass fraction of LiBOB and the mass fraction of VC is measured by an NMR (nuclear magnetic resonance) method. Measurement of each of the mass fraction of LiBOB and the mass fraction of VC is carried out three times or more. The arithmetic mean of these three or more measurements is used. The arithmetic mean is converted into a percentage. The mass fraction of LiBOB and the mass fraction of VC (in percentage) are significant to two decimal place. It is rounded to two decimal place.

The solvent is aprotic. The solvent may include an optional component. The solvent may include, for example, at least one selected from the group consisting of ethylene carbonate (EC), propylene carbonate (PC), butylene carbonate (BC), fluoroethylene carbonate (FEC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. The supporting electrolyte may include, for example, at least one selected from the group consisting of $LiPF_6$, $LiBF_4$, and $LiN(FSO_2)_2$. The supporting electrolyte may have a concentration from 0.5 mol/L to 2.0 mol/L, for example. The supporting electrolyte may have a concentration from 0.8 mol/L to 1.2 mol/L, for example.

<<(B) Initial Charging>>

The method of producing a battery according to the present embodiment includes performing initial charging of battery 100 including the electrolyte solution. It is considered that, during initial charging, part of LiBOB and VC undergoes reduction and degradation to form a film on a surface of negative electrode 20.

In the present embodiment, any charge-discharge apparatus may be used. Initial charging may be performed in a constant-current mode or may be performed in a constant current-constant voltage mode, for example. Initial charging may be performed in an environment at normal temperature, for example. Initial charging may be performed in an environment at a temperature of 20° C.±15° C., for example. Initial charging may be continued until the state of charge (SOC) reaches 100%, for example. In the present embodiment, the state in which a capacity corresponding to the rated capacity is charged is defined as an SOC of 100%. Initial charging may be continued until SOC reaches 80%, for example. Initial charging may be continued until SOC reaches 60%, for example. Initial charging may be continued until SOC reaches 40%, for example.

The electric current during initial charging may be from 0.1 It to 2 It, for example. "It" is a symbol representing an electric current hour rate. In the present embodiment, with an electric current of 1 It, battery 100 is charged to its rated capacity in one hour. After initial charging, battery 100 may be discharged, for example. After initial charging, battery 100 may be charged and discharged and the initial capacity may be measured, for example.

<<(C) Aging>>

The method of producing a battery according to the present embodiment includes aging battery 100 after initial charging. The aging according to the present embodiment means storing battery 100 in an environment at a temperature of 40° C. or more for a predetermined length of time. The aging according to the present embodiment is performed so as to allow LiBOB and VC remaining in the electrolyte solution after initial charging to degrade.

After aging, in the electrolyte solution, the mass fraction of LiBOB is less than 0.10% and the mass fraction of VC is less than 0.10%. With this, a desired level of capacity retention and a decreased amount of gas generation during high-temperature storage are expected to be obtained.

After aging, each of the mass fraction of LiBOB and the mass fraction of VC, independently, may be 0.08% or less, or may be 0.06% or less, or may be 0.04% or less, or may be 0.02% or less, for example. The mass fraction of LiBOB and the mass fraction of VC may be 0%, for example. However, when the mass fraction of LiBOB and the mass fraction of VC are 0%, cycle endurance may decrease, for example. The mass fraction of LiBOB and the mass fraction of VC may be 0.02% or more, for example.

After aging, the sum of the mass fraction of LiBOB and the mass fraction of VC may be less than 0.10%, may be 0.08% or less, or may be 0.04% or less, for example.

Figure 4:
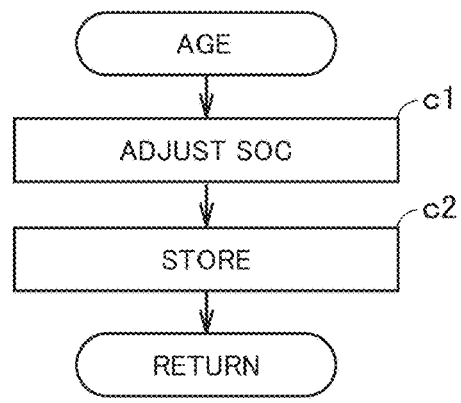
FIG. 4 is a schematic flowchart depicting an aging according to the present embodiment.

FIG. 4 is a schematic flowchart depicting the aging according to the present embodiment.

The aging may include "(c1) adjusting SOC" and "(c2) storing", for example. The aging is performed so that both the mass fraction of LiBOB and the mass fraction of VC become less than 0.10%.

<<(c1) Adjusting SOC>>

The aging according to the present embodiment may include, for example, adjusting the SOC of battery 100 so that the electric potential of the negative electrode is equal to or less than the reduction potentials of LiBOB and VC.

The reduction potential means the electric potential at which the substance starts to be reduced and degraded. The reduction potential of LiBOB may be about 1.8 V (vs. $Li^+/Li$). The reduction potential of VC may be about 0.7 V (vs. $Li^+/Li$). Therefore, the SOC of battery 100 may be adjusted so that the electric potential of the negative electrode is 0.7 V (vs. $Li^+/Li$) or less, for example. The SOC of battery 100 may be adjusted so that the electric potential of the negative electrode is from 0 V (vs. $Li^+/Li$) to 0.7 V (vs. $Li^+/Li$), for example. The SOC of battery 100 may be adjusted so that the electric potential of the negative electrode is from 0.1 V (vs. $Li^+/Li$) to 0.5 V (vs. $Li^+/Li$), for example. The expression "(vs. $Li^+/Li$)" means that the value of electric potential is relative to the standard electrode potential of lithium.

The SOC of battery 100 may be adjusted to a value from 50% to 80% or may be adjusted to a value from 50% to 70%, for example. After the SOC adjustment, the voltage of battery 100 may be from about 3.70 V to about 3.80 V or may be from about 3.75 V to about 3.80 V, for example.

<<(c2) Storing>>

The aging according to the present embodiment may include, for example, storing battery 100 in an environment at a temperature of 60° C. or more for 10 hours or more. In an environment at a temperature of 60° C. or more, the reduction and degradation of LiBOB and VC may be promoted. For example, in a thermostatic chamber that is set at a temperature of 60° C. or more, battery 100 may be stored for a predetermined length of time. In the present embodiment, when the temperature of the thermostatic chamber and/or the like is set at 60° C. or more, it is regarded as that the aging is performed in an environment at a temperature of 60° C. or more. In the present embodiment, the temperature at which the aging is performed is also called "an aging temperature". The higher the aging temperature is, the more promoted the reduction and degradation of LiBOB and VC may be. However, when the aging temperature is too high, components other than LiBOB and VC may also undergo reaction. The aging temperature may be from 60° C. to 85° C., or may be from 65° C. to 80° C., or may be from 70° C. to 80° C., for example.

When a storage duration is 10 hours or more, reduction and degradation of LiBOB and VC are expected to proceed sufficiently. The storage duration may be from 10 hours to 48 hours, or may be from 10 hours to 24 hours, or may be from 12 hours to 18 hours, for example.

EXAMPLES

Next, examples according to the present disclosure (hereinafter also called "the present example") will be described. It should be noted that the below description does not limit the scope of claims.

<No. 1>

<<Battery Configuration>>

A test battery was assembled. The test battery had the configuration described below.

Composition of positive electrode composite material: (positive electrode active material)/AB/PVdF=90.3/7/2.7 (mass ratio)

Positive electrode active material: $Li(NiCoMn)O_2$
Positive electrode current collector: Al foil
Composition of negative electrode composite material: (negative electrode active material)/CMC/SBR=99/0.6/0.4 (mass ratio)
Negative electrode active material: graphite
Negative electrode current collector: Cu foil
Housing: pouch made of aluminum-laminated film
Rated capacity: 137 mAh <<Electrolyte Solution Composition>>

An electrolyte solution was prepared. The electrolyte solution had the composition described below.

Solvent: EC/EMC/DMC/MP=25/37/35/3 (volume ratio)
Supporting electrolyte: $LiPF_6$
Additives: LiBOB [0.39% (mass fraction)], VC [0.1% (mass fraction)]

<<(A) Injecting Electrolyte Solution, (B) Initial Charging, (C) Aging>>

The electrolyte solution was injected into the test battery. After the electrolyte solution was injected, initial charging was performed. After initial charging, aging of the test battery was performed. The aging conditions are as follows.

SOC: 60% (voltage, 3.755 V)
Aging temperature: 75° C.
Storage duration: 16 hours <No. 2 to No. 7>

Test batteries were produced in the same manner as for No. 1 except that the composition of additives in the initial electrolyte solution was changed as specified in Table 1. For each test battery (each of batteries No. 1 to No. 7), multiple batteries were produced. After aging, the electrolyte solution was collected from some of the test batteries, and the mass fraction of LiBOB and the mass fraction of VC were measured. The mass fraction of LiBOB and the mass fraction of VC after aging are given in Table 1.

<Evaluation>

The SOC of the test battery was adjusted to 80%. After the SOC adjustment, the test battery was stored in a thermostatic chamber set at 60° C., for 56 days. Before and after storage, the volume of the test battery was measured. The volume was measured according to Archimedes' principle. From the volumes before and after storage, the amount of gas generation was calculated. The discharged capacities of the test battery before and after storage were measured. From the discharged capacities before and after storage, capacity retention was calculated. The amount of gas generation and the capacity retention are given in Table 1.

TABLE 1

| | Upon injection Initial electrolyte solution | | After aging Electrolyte solution | | Evaluation High-temperature storage test 60° C., SOC 80%, 56 days | |
|---|---|---|---|---|---|---|
| | Additives | | Additives | | Amount of | Capacity |
| No. | LiBOB [%][1] | VC [%][1] | LiBOB [%][1] | VC [%][1] | gas generation [cm$^3$] | retention [%] |
| 1 | 0.39 | 0.1 | 0.02 | 0.02 | 0.75 | 90.7 |
| 2 | 0.39 | 0.3 | 0.02 | 0.06 | 0.73 | 91.3 |
| 3 | 0.78 | 0 | 0.17 | 0 | 0.98 | 90.8 |
| 4 | 0.39 | 0 | 0.05 | 0 | 0.88 | 89.7 |
| 5 | 0.62 | 0 | 0.06 | 0 | 0.82 | 91.5 |
| 6 | 0 | 0.3 | 0 | 0.08 | 0.77 | 89.4 |
| 7 | 0 | 0 | 0 | 0 | 0.96 | 88.7 |

[1]Mass fraction of the component in the whole electrolyte solution

RESULTS

As for No. 3 to No. 5, the initial electrolyte solution does not contain VC. When the initial electrolyte solution does not contain VC, the amount of gas generation tends to increase.

After aging, No. 3 has a mass fraction of LiBOB not less than 0.10%. No. 3 has a markedly high amount of gas generation.

As for No. 6, the initial electrolyte solution does not contain LiBOB. When the initial electrolyte solution does not contain LiBOB, capacity retention tends to be low.

As for No. 1 and No. 2, the initial electrolyte solution contains both LiBOB and VC. As for No. 1 and No. 2, both the mass fraction of LiBOB and the mass fraction of VC are less than 0.10% after aging. As for No. 1 and No. 2, the capacity retention tends to be high and the amount of gas generation tends to be low.

The present embodiment and the present example are illustrative in any respect. The present embodiment and the present example are non-restrictive. For example, it is expected that certain configurations of the present embodiments and the present examples can be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A method of producing a lithium-ion battery, comprising:
   (A) injecting an electrolyte solution into a lithium-ion battery, the electrolyte solution containing lithium bis(oxalato)borate and vinylene carbonate;
   (B) performing initial charging of the lithium-ion battery including the electrolyte solution; and
   (C) aging the lithium-ion battery after the initial charging, wherein during the (A), in the electrolyte solution, a mass fraction of lithium bis(oxalato)borate is more than 0.10% and not more than 0.50%, and a mass fraction of vinylene carbonate is not less than 0.10% and not more than 0.50%,
   during the aging, lithium bis(oxalato)borate and vinylene carbonate contained in the electrolyte solution are degraded, and
   after the aging, in the electrolyte solution, a mass fraction of lithium bis(oxalato)borate is less than 0.10% and a mass fraction of vinylene carbonate is less than 0.10%,
   the aging comprises:
   (c1) adjusting a state of charge of the lithium-ion battery to a range of 50% to 80% so that an electric potential of a negative electrode is equal to or less than both a reduction potential of lithium bis(oxalato)borate and a reduction potential of vinylene carbonate; and
   (c2) storing the lithium-ion battery in an environment at a temperature of range of 60° C. to 85° C. for a time range of 10 hours to 48 hours.

2. The method of producing a lithium-ion battery according to claim 1, wherein
   during the (A), in the electrolyte solution, the mass fraction of vinylene carbonate is not less than 0.10% and not more than 0.30%.

3. The method of producing a lithium-ion battery according to claim 1, wherein
   after the aging, in the electrolyte solution, a mass fraction of lithium bis(oxalato)borate is not less than 0.02% less than 0.10% and a mass fraction of vinylene carbonate is not less than 0.02% less than 0.10%.

4. The method of producing a lithium-ion battery according to claim 1, wherein
   during the (A), in the electrolyte solution, a total mass fraction of lithium bis(oxalato)borate and vinylene carbonate is not less than 0.4% and not more than 0.7%.

5. The method of producing a lithium-ion battery according to claim 1, wherein
   during the (c1), when the state of charge of the lithium-ion battery is in the range of 50% to 80%, a voltage of the lithium-ion battery is in the range of 3.7 V to 3.8 V.

* * * * *